US008747951B2

(12) United States Patent
Oyaizu et al.

(10) Patent No.: US 8,747,951 B2
(45) Date of Patent: Jun. 10, 2014

(54) METHOD FOR MANUFACTURING HOSE WITH PROTECTOR LAYER

(71) Applicant: Tokai Rubber Industries, Ltd., Komaki (JP)

(72) Inventors: Naoki Oyaizu, Komaki (JP); Kazutaka Katayama, Kasugai (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 0 days.

(21) Appl. No.: 13/648,676

(22) Filed: Oct. 10, 2012

(65) Prior Publication Data

US 2013/0064980 A1    Mar. 14, 2013

Related U.S. Application Data

(63) Continuation of application No. PCT/JP2011/070741, filed on Sep. 12, 2011.

(51) Int. Cl.
*B05D 3/02* (2006.01)

(52) U.S. Cl.
USPC .................................... 427/385.5; 427/393.5

(58) Field of Classification Search
USPC ........................................ 427/385.5, 393.5
See application file for complete search history.

(56) References Cited

U.S. PATENT DOCUMENTS 7,001,941 B2 *  2/2006  Li ................................ 524/413

FOREIGN PATENT DOCUMENTS

| JP | 06-256600 | A | 9/1994 |
| JP | 2001-128510 | A | 5/2001 |
| JP | 2002-181254 | A | 6/2002 |
| JP | 2006-272898 | A | 10/2006 |
| JP | 3959215 | B2 | 8/2007 |
| JP | 5027342 | * | 9/2012 ................ B32B 1/08 |

OTHER PUBLICATIONS

Machine Translation of JP5027342.*

* cited by examiner

*Primary Examiner* — Robert S Walters, Jr.
(74) *Attorney, Agent, or Firm* — Westerman, Hattori, Daniels & Adrian, LLP

(57) ABSTRACT

A method for manufacturing a hose with a protector layer 2 on the outer periphery of a tubular polyamide resin layer 1 includes steps of: preparing a rubber composition for forming the protector layer by separately preparing a first rubber material containing components (A) to (C) and a second rubber material containing components (a) and (b) but substantially free of a sulfur vulcanization agent and mixing them in a mixer; and forming the protector layer 2 by continuously vulcanizing unvulcanized rubber after continuous extrusion of the rubber composition onto the outer periphery of the previously formed polyamide resin layer 1.

(A) Ethylene-propylene rubber
(B) Sulfur vulcanization agent
(C) Thiuram vulcanization accelerator (mp. 66 to 105° C.)
(a) Ethylene-propylene rubber
(b) Vulcanization accelerator (mp. 120° C. or higher).

11 Claims, 1 Drawing Sheet

METHOD FOR MANUFACTURING HOSE WITH PROTECTOR LAYER

TECHNICAL FIELD

The present invention relates to a method for manufacturing a hose with a protector layer having a protector layer formed on an outer periphery of a tubular polyamide resin layer, and more particularly to a method for continuously manufacturing a hose with a protector layer used for a fuel hose, a refrigerant-transporting hose, and the like.

BACKGROUND OF THE INVENTION

Generally, a fuel hose has a protector layer made of a rubber composition formed so as to cover an outer periphery of a resin layer made of fluorine resin or polyamide resin. A protector layer is formed in this manner to prevent a fire or the like when a resin layer of the fuel hose is torn and fuel is leaked on a vehicle clash. Heretofore, a high activation vulcanization accelerator, for example, a thiuram vulcanization accelerator has been used for such a protector layer of the fuel hose to accelerate vulcanization (to reduce vulcanization time) (for example, see Patent Literature 1).

CITATION LIST

Patent Literature

Patent Literature 1: Japanese Patent No. 3959215

However, the use of a high activation vulcanization accelerator as described above can accelerate vulcanization, but facilitates occurrence of a scorch (a phenomenon causing vulcanization). Leaving at the room temperature also causes a vulcanization reaction to proceed. Therefore, a problem such as significant degradation of storage stability occurs. In addition, an increase in the vulcanization temperature can accelerate vulcanization. However, in a product integrated with a resin material, the increased vulcanization temperature causes a problem such as melt and thermal degradation of resin.

The present invention has been made in consideration of such a situation, and aims to provide a method for manufacturing a hose with a protector layer having excellent storage stability and capable of accelerating vulcanization.

SUMMARY OF THE INVENTION

In order to achieve the above object, a method for manufacturing a hose with a protector layer according to the present invention is a method for manufacturing a hose with a protector layer having a protector layer formed on an outer periphery of a tubular polyamide resin layer, the method including steps of: preparing a rubber composition for forming the protector layer by separately preparing a first rubber material that contains the following components (A) to (C) and a second rubber material that contains the following components (a) and (b) but does not substantially contain a sulfur vulcanization agent and mixing these materials in a mixer; and forming the protector layer by continuously vulcanizing unvulcanized rubber after the rubber composition is continuously extruded onto the outer periphery of the previously formed polyamide resin layer.
(A) Ethylene-propylene rubber
(B) Sulfur vulcanization agent
(C) Thiuram vulcanization accelerator with the melting point of 66 to 105° C.
(a) Ethylene-propylene rubber
(b) Vulcanization accelerator with the melting point of 120° C. or higher The present inventors have intensively researched on a method for manufacturing a hose with a protector layer having excellent storage stability and capable of accelerating vulcanization. In course of the research, a formation of a rubber composition for forming a protector layer was divided into two formulation systems: a formulation system (a first rubber material) that contains the particular thiuram vulcanization accelerator (component C), which is a so-called sulfur releasing primary accelerator, and a sulfur vulcanization agent (component B); and a formulation system (a second rubber material) that contains the particular vulcanization accelerator (component b), which is a sulfur non-releasing secondary accelerator, but does not substantially contain a sulfur vulcanization agent. These formulation systems were then mixed together, followed by being subjected to an extruding process and a vulcanization process. As a result, the present inventors have found that excellent storage stability and accelerated vulcanization can be attained because a vulcanization rate can be appropriately controlled, and completed the present invention.

As described above, in a method for manufacturing a hose with a protector layer according to the present invention, a formulation of a rubber composition for forming a protector layer is divided into two formulation systems: a formulation system (a first rubber material) that contains the particular thiuram vulcanization accelerator (component C), which is a so-called sulfur releasing primary accelerator, and a sulfur vulcanization agent (component B); and a formulation system (a second rubber material) that contains the particular vulcanization accelerator (component b), which is a sulfur non-releasing secondary accelerator, but does not substantially contain a sulfur vulcanization agent. These formulation systems are mixed, and then subjected to an extruding process and a vulcanization process. As a result, a vulcanization rate can be appropriately controlled. Therefore, excellent storage stability and accelerated vulcanization can be achieved.

In a conventional method for manufacturing a hose, after a rubber composition for forming a protector layer is extruded, this unvulcanized hose is moved to a vulcanization can to carry out a vulcanization process. That is, an extruding process and a vulcanization process are carried out separately (not consecutively). However, in a manufacturing method of the present invention, an extruding process and a vulcanization process are carried out consecutively. Therefore, improved workability, lower cost, and reduced manufacturing time can be achieved.

In addition, if the component C is tetraethylthiuram disulfide, or if the component b is at least one of zinc dimethyldithiocarbamate and 2-mercaptobenzothiazole, preferred dispersibility is achieved when the first rubber material and the second rubber material are mixed.

Further, a polyamide resin layer made of polyamide 12 (PA12) is preferred than a polyamide resin layer made of polyamide 11 (PA11) or polyamide 6 (PA6) in terms of hydrolysis resistance property and chemical resistance property.

In addition, the vulcanization temperature of 100 to 170° C. is preferred in terms of the fact that there is no influence of melt or thermal degradation of a hose forming material.

Furthermore, the content of each component described above set within a particular range is preferred in terms of a vulcanization rate (acceleration) at the time when the first rubber material and the second rubber material are mixed.

DESCRIPTION OF EMBODIMENTS

Next, embodiments of the present invention will be described in detail. However, the present invention is not limited to the embodiments.

Figure 1:
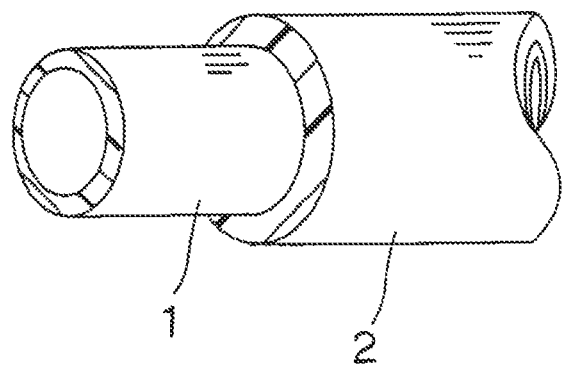
FIG. 1 is a perspective view illustrating a schematic configuration of a hose with a protector layer obtained by a manufacturing method of the present invention.

An example of a hose with a protector layer obtained by a manufacturing method of the present invention has a protector layer 2 formed on an outer periphery surface of a tubular polyamide resin layer 1, as shown in FIG. 1.

The method for manufacturing a hose with a protector layer according to the present invention is characterized by including steps of: preparing a rubber composition for forming the protector layer by separately preparing a first rubber material that contains the following components (A) to (C) and a second rubber material that contains the following components (a) and (b) but does not substantially contain a sulfur vulcanization agent and mixing these materials in a mixer; and forming the protector layer 2 by continuously vulcanizing unvulcanized rubber after the rubber composition is continuously extruded onto the outer periphery of the previously formed polyamide resin layer 1.

(A) Ethylene-propylene rubber
(B) Sulfur vulcanization agent
(C) Thiuram vulcanization accelerator with the melting point of 66 to 105° C.
(a) Ethylene-propylene rubber
(b) Vulcanization accelerator with the melting point of 120° C. or higher <<Polyamide Resin Layer 1>>

Examples of polyamide resin for forming the polyamide resin layer 1 include polyamide 6 (PA6), polyamide 46 (PA46), polyamide 66 (PA66), polyamide 92 (PA92), polyamide 99 (PA99), polyamide 610 (PA610), polyamide 612 (PA612), polyamide 1010 (PA1010), polyamide 11 (PA11), polyamide 912 (PA912), polyamide 12 (PA12), copolymer of polyamide 6 and polyamide 66 (PA6/66), copolymer of polyamide 6 and polyamide 12 (PA6/12), and aromatic nylon. These substances may be used alone or in combination of two or more. Among these substances, PA12 is preferred in terms of hydrolysis resistance property and chemical resistance property.

Next, each component of the rubber composition for forming the protector layer will be described. The rubber composition is made of the first rubber material that contains the components A to C and the second rubber material that contains the components a and b but does not substantially contain a sulfur vulcanization agent.

In the present invention, "the second rubber material does not substantially contain a sulfur vulcanization agent" means that sulfur as a vulcanization agent is not included in the rubber material.

<<First Rubber Material>>
<Ethylene-Propylene Rubber (Component A)>

Examples of the ethylene-propylene rubber (component A) include ethylene-propylene copolymer (EPM) and ethylene-propylene-diene terpolymer (EPDM). These substances may be used alone or in combination.

The EPDM preferably has an iodine value of 6 to 30 and an ethylene proportion of 45 to 75 weight %, more preferably an iodine value of 10 to 24 and an ethylene proportion of 50 to 65 weight %.

A diene monomer (third component) contained in the EPDM is preferably a diene monomer having 5 to 20 carbon atoms. Specifically, examples of the diene monomer (third component) include 1,4-pentadiene, 1,4-hexadiene, 1,5-hexadiene, 2,5-dimethyl-1,5-hexadiene, 1,4-octadiene, 1,4-cyclohexadiene, cyclooctadiene, dicyclopentadiene (DCP), 5-ethylidene-2-norbornene (ENB), 5-butylidene-2-norbornene, 2-methallyl-5-norbornene, and 2-isopropenyl-5-norbornene. Among these diene monomers (third components), dicyclopentadiene (DCP) and 5-ethylidene-2-norbornene (ENB) are preferred.

<Sulfur Vulcanization Agent (Component B)>

The sulfur vulcanization agent (component B) to be used is sulfur such as powdered sulfur, precipitated sulfur, or insoluble sulfur.

The content of the sulfur vulcanization agent (component B) is preferably 1 to 4 parts by weight, more preferably 2 to 3 parts by weight with respect to 100 parts by weight of the ethylene-propylene rubber (component A). If the content of the component B is too small, a vulcanization rate is likely to be lower when the first rubber material and the second rubber material are mixed. If the content of the component B is too large, heat resistance property tends to be degraded.

<Particular Thiuram Vulcanization Accelerator (Component C)>

The melting point of the particular thiuram vulcanization accelerator (component C) to be used is 66 to 105° C. If the melting point of the particular thiuram vulcanization accelerator (component C) is too low, storage stability will be degraded when the first rubber material and the second rubber material are mixed. If the melting point is too high, dispersibility will be degraded and the vulcanization rate will be lower when the first rubber material and the second rubber material are mixed.

Specific examples of the particular thiuram vulcanization accelerator (component C) include tetraethylthiuram disulfide (melting point 65° C. or higher), tetramethylthiuram monosulfide (melting point 103° C. or higher), and dipentamethylenethiuram tetrasulfide (melting point 105° C.). These substances may be used alone or in combination of two or more. Among these substances, a combination of tetraethylthiuram monosulfide and dipentamethylenethiuram tetrasulfide is preferred because the vulcanization rate will be higher when the first rubber material and the second rubber material are mixed.

The content of the particular thiuram vulcanization accelerator (component C) is preferably 0.1 to 3 parts by weight, more preferably 1 to 1.4 parts by weight with respect to 100 parts by weight of the ethylene-propylene rubber (component A). If the content of the component C is too small, the vulcanization rate is likely to be lower when the first rubber material and the second rubber material are mixed. If the content of the component C is too large, heat resistance property will be degraded.

If needed, the first rubber material may be suitably mixed with carbon black, a retrograde inhibitor, a vulcanization aid agent, a processing aid agent, a white filler, a plasticizer, a softening agent, an acid acceptor, a colorant, a scorch inhibitor, and the like in addition to the ethylene-propylene rubber (component A), the sulfur vulcanization agent (component B), and the particular thiuram vulcanization accelerator (component C).

<<Second Rubber Material>>

<Ethylene-Propylene Rubber (Component A)>

The ethylene-propylene rubber (component a) to be used may be the same as the ethylene-propylene rubber (component A) described as a component of the first rubber material.

<Particular Vulcanization Accelerator (Component B)>

The particular vulcanization accelerator (component b) to be used has the melting point of 120° C. or higher, preferably 120 to 245° C. If the melting point of the particular vulcanization accelerator (component b) is too low, the vulcanization rate will be lower when the first rubber material and the second rubber material are mixed.

Examples of the particular vulcanization accelerator (component b) include a dithiocarbamate vulcanization accelerator, a thiazole vulcanization accelerator, a xanthate vulcanization accelerator, and the like. These substances may be used alone or in combination of two or more.

Specific examples of the dithiocarbamate vulcanization accelerator include piperidinium pentamethylenedithiocarbamate (melting point 160° C. or higher), pipecolin pipecolyldithiocarbamate (melting point 120° C. or higher), zinc diethyldithiocarbamate (melting point 175° C. or higher), zinc N-ethyl-N-phenyldithiocarbamate (melting point 195° C. or higher), zinc dibenzyldithiocarbamate (melting point 170° C. or higher), zinc N-pentamethylenedithiocarbamate (melting point 220° C. or higher), and zinc dimethyldithiocarbamate (melting point 245° C. or higher).

Specific examples of the thiazole vulcanization accelerator include 2-mercaptobenzothiazole (melting point 173° C. or higher), dibenzothiazyl disulfide (melting point 170° C.), zinc salt of 2-mercaptobenzothiazole (melting point 200° C. or higher), cyclohexylamine salt of 2-mercaptobenzothiazole (melting point 150° C. or higher), and 2-(4'-morpholinodithio)benzothiazole (melting point 123° C. or higher).

A specific example of the xanthate vulcanization accelerator includes zinc isopropylxanthate (melting point 145° C.).

The content of the particular vulcanization accelerator (component b) is preferably 2 to 6 parts by weight, more preferably 2.6 to 5.2 parts by weight with respect to 100 parts by weight of the ethylene-propylene rubber (component a). If the content of the component b is too small, the vulcanization rate is likely to be lower when the first rubber material and the second rubber material are mixed. If the content of the component b is too large, heat resistance property will be degraded.

If needed, the second rubber material may suitably be mixed with carbon black, a retrograde inhibitor, a vulcanization aid agent, a processing aid agent, a white filler, a plasticizer, a softening agent, an acid acceptor, a colorant, a scorch inhibitor, and the like in addition to the ethylene-propylene rubber (component a) and the particular vulcanization accelerator (component b).

Here, the mixture ratio by weight of the first rubber material (X) and the second rubber material (Y) is preferably in a range of X/Y=30/70 to 70/30, more preferably in a range of X/Y=40/60 to 60/40.

A hose with a protector layer according to the present invention can be manufactured as follows. First, pellets made of polyamide resin are extruded into a hose-like shape to form a tubular polyamide resin layer 1. On the other hand, the first rubber material that contains the components A to C and the second rubber material that contains the components a and b but does not substantially contain a sulfur vulcanization agent are separately prepared. Next, the two rubber materials are mixed in an extruding machine to prepare a rubber composition for forming a protector layer. The temperature at the time of mixing is preferably 70 to 90° C. Subsequently, this rubber composition is continuously extruded onto an outer periphery of the polyamide resin layer 1 to make an unvulcanized hose. This unvulcanized hose is continuously supplied to a hot-air furnace, a steam tube, and the like. The unvulcanized rubber is vulcanized to form a protector layer 2. In this manner, a hose with a protector layer having the protector layer 2 formed on the outer periphery surface of the polyamide resin layer 1 (see FIG. 1) can be continuously manufactured.

The extruding machine to be used may be, for example, a screw type mixer that can simultaneously stir and mix the first rubber material and the second rubber material. For example, the screw type mixer houses a screw having spiral rotating vanes. The rotation axis of the screw is rotated by a rotation force of a motor. In addition, a supply port for the first rubber material and a supply port for the second rubber material are provided on an upstream part of the screw type mixer.

The vulcanization temperature is preferably 100 to 170° C., more preferably 135 to 160° C. If the vulcanization temperature is too low, vulcanization cannot be efficiently carried out. If the vulcanization temperature is too high, a problem such as melt and thermal degradation of the polyamide resin layer 1 occurs.

Figure 2:
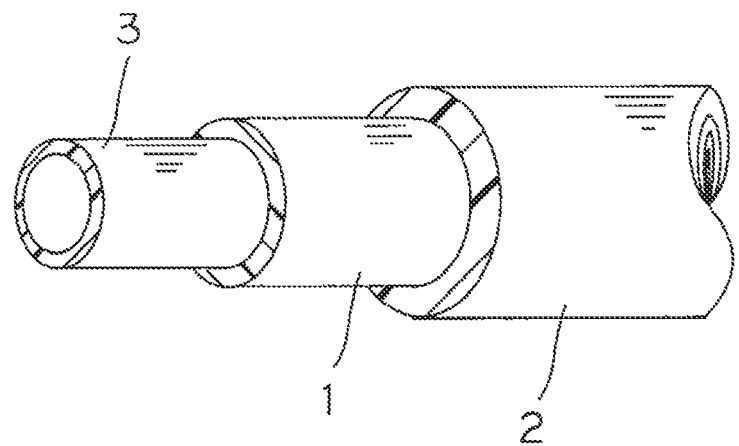
FIG. 2 is a perspective view illustrating a schematic configuration of another hose with a protector layer obtained by a manufacturing method of the present invention.

The configuration of a hose with a protector layer obtained by the manufacturing method of the present invention is not limited to a two-layer structure including the polyamide resin layer 1 and the protector layer 2 as shown in FIG. 1, but various layer configurations may be adopted according to an application of the hose. A hose with a protector layer obtained by the manufacturing method of the present invention may have a layer configuration in which another layer is provided between the polyamide resin layer 1 and the protector layer 2. In addition, in terms of fuel low permeability, as shown in FIG. 2, a three-layer structure, in which a fluorine resin layer (innermost layer) 3 is formed on an inner periphery surface of the polyamide resin layer 1, may be adopted. If needed, an adhesive may be used among the layers.

Examples of fluorine resin for forming the fluorine resin layer 3 include polyvinyl fluoride (PVF), polyvinylidene fluoride (PVDF), polychlorotrifluoroethylene (CTFE), polytetrafluoroethylene (PTFE), tetrafluoroethylene-hexafluoro copolymer (FEP), tetrafluoroethylene-perfluoroalkylvinylether copolymer (PFA), tetrafluoroethylene-hexafluoropropylene-vinylidene fluoride copolymer (THV), ethylene-tetrafluoroethylene copolymer (ETFE), and ethylene-polychlorotrifluoroethylene copolymer (ECTFE), and a modified copolymer and various graft polymers thereof. These substances may be used alone or in combination of two or more. The fluorine resin to be used may be a conductive fluorine resin to which conductivity is imparted by the addition of carbon black, carbon fiber, carbon nanotube, a conductive polymer, and the like.

The inner diameter of a hose with a protector layer obtained by the manufacturing method of the present invention is usually 1 to 40 mm, preferably 2 to 36 mm, though it depends on an application of the hose. The thickness of the fluorine resin layer (innermost layer) 3 is usually 0.02 to 1.0 mm, preferably 0.05 to 0.6 mm. The thickness of the polyamide resin layer 1 is usually 0.03 to 1.5 mm, preferably 0.05 to 1.0 mm. The thickness of the protector layer 2 is usually 0.5 to 4.0 mm, preferably 1.0 to 2.5 mm.

Examples of an application of a hose with a protector layer obtained by the manufacturing method of the present invention include a fuel hose and a refrigerant-transporting hose. An example of the fuel hose includes a hose for transporting automobile fuel such as gasoline, alcohol-mixed gasoline, diesel fuel, compressed natural gas (CNG), and liquefied petroleum gas (LPG). In addition, examples of the refrigerant-transporting hose include an air conditioner hose and a radiator hose of an automobile. These hoses can be used not only in automobiles but also for other transportation machines (including airplanes, industrial transport vehicles such as forklifts, loading shovels, and cranes, and rail cars) and the like.

EXAMPLES

Next, an example will be described together with comparative examples. However, the present invention is not limited to the example.

Prior to describing the example and the comparative examples, rubber materials for forming a protector layer described below were prepared.
[EPDM (i) (Component A or Component a)]
ESPRENE 522, manufactured by Sumitomo Chemical Co., Ltd.
[EPDM (ii) (Component A or Component a)]
ESPRENE 601, manufactured by Sumitomo Chemical Co., Ltd.
[Stearic Acid]
STEARIC ACID SAKURA BEAD, manufactured by NOF Corporation
[Zinc Oxide]
ZINC OXIDE TYPE 2, manufactured by Sakai Chemical Industry Co., Ltd.
[Carbon Black]
FEF class carbon black (SEAST SO, manufactured by Tokai Carbon Co., Ltd.)
[Heavy Calcium Carbonate]
WHITON SB, manufactured by Shiraishi Calcium Kaisha, Ltd.
[Naphthene Process Oil]
DIANA PROCESS NM280, manufactured by Idemitsu Kosan Co., Ltd.
[Dithiocarbamate Vulcanization Accelerator (Component b)]
Zinc dimethyldithiocarbamate (NOKSELER PZ, manufactured by Ouchi Shinko Chemical Industrial Co., Ltd., melting point 245° C. or higher)
[Thiuram Vulcanization Accelerator (i)]
Tetramethylthiuram disulfide (TMTD) (SANCELER TT-G, manufactured by Sanshin Chemical Industry Co., Ltd., melting point 140° C. or higher)
[Thiuram Vulcanization Accelerator (ii) (Component C)]
Tetraethylthiuram disulfide (SANCELER TET-G, manufactured by Sanshin Chemical Industry Co., Ltd., melting point 66° C. or higher)
[Thiuram Vulcanization Accelerator (iii)]
Dipentamethylenethiuram tetrasulfide (NOKSELER TRA, manufactured by Ouchi Shinko Chemical Industrial Co., Ltd., melting point 105° C. or higher)
[Sulfenamide Vulcanization Accelerator]
N-cyclohexyl-2-benzothiazolylsulfenamide (NOKSELER CZ-G(CZ), manufactured by Ouchi Shinko Chemical Industrial Co., Ltd., melting point 94° C. or higher)
[Thiazole Vulcanization Accelerator (Component b)]
2-mercaptobenzothiazole (NOKSELER M-P, manufactured by Ouchi Shinko Chemical Industrial Co., Ltd., melting point 173° C. or higher)
[Sulfur Vulcanization Agent (Component B)]
SULFAX T-10, manufactured by Karuizawa Seirenjo Co.
[Preparation of Rubber Material]
Components shown in Table 1 below were mixed at a ratio shown in Table 1 to prepare rubber materials.

TABLE 1

| | Rubber Material (parts by weight) | | | |
|---|---|---|---|---|
| | A | B | C | D |
| EPDM (i) | 80 | 80 | 80 | 80 |
| EPDM (ii) | 34 | 34 | 34 | 34 |
| Stearic acid | 0.5 | 0.5 | 0.5 | 0.5 |
| Zinc oxide | 3 | 3 | 3 | 3 |
| Carbon black | 85 | 85 | 85 | 85 |
| Heavy calcium carbonate | 70 | 70 | 70 | 70 |
| Naphthene process oil | 70 | 70 | 70 | 70 |
| Dithiocarbamate vulcanization accelerator | 2.4 | — | — | — |
| Thiuram vulcanization accelerator (i) | — | — | 0.4 | 0.6 |
| Thiuram vulcanization accelerator (ii) | — | 0.4 | — | 0.4 |
| Thiuram vulcanization accelerator (iii) | — | — | — | 0.6 |
| Sulfenamide vulcanization accelerator | — | 2 | 2 | 0.5 |
| Thiazole vulcanization accelerator | 2.8 | — | — | 0.4 |
| Sulfur vulcanization agent | — | 2.68 | 2.68 | 2.68 |
| Total | 347.7 | 349.98 | 349.98 | 347.14 |
| Storage stability | good | good | good | poor |

The rubber materials obtained in the above manner were subjected to evaluation of their storage stabilities in accordance with the following criteria. The results are shown in Table 1 above
[Storage Stability]
Each rubber material was left at the room temperature (25° C.) for 90 days, and a scorch time at the time when the value has risen by 5M from the lowest value in the reading of Mooney was measured according to JIS K6300-1. In this measurement, VR-1132 manufactured by Ueshima Seisakusho Co., Ltd. was used. If the scorch time was 10 minutes or more, storage stability was evaluated as good. If the scorch time was less than 10 minutes, storage stability was evaluated as poor.

Next, a hose with a protector layer was made by using the rubber materials as follows.

Example 1

Pellets of a copolymer of ethylene, hexafluoropropylene, and tetrafluoroethylene (EFEP) (NEOFLON RP5000, manufactured by Daikin Industries, Ltd.) and pellets of polyamide 12 (PA12) (RILSAN AESN NOIR P20TL, manufactured by Arkema, melting point 170° C.) were extruded into a hose-like shape to make a resin hose having an inner layer (polyamide resin layer) on an outer periphery surface of an innermost layer (fluorine resin layer). In addition, a rubber composition for forming a protector layer was prepared by separately preparing the first rubber material and the second rubber material and mixing these rubber materials in a screw type mixer (60G-12D-HB, manufactured by Mitsuba MFG. Co., Ltd.). The temperature at the time of mixing was controlled to be 80 to 105° C. Then, this rubber composition was continuously extruded onto an outer periphery of the inner layer (polyamide resin layer) to make an unvulcanized hose. The protector layer was formed by continuously supplying the unvulcanized hose to a hot-air furnace and carrying out vulcanization (150° C.×5 minutes). In this manner, a hose (inner diameter 3 mm) having an inner layer (thickness 1.5 mm) formed on an outer periphery surface of an innermost layer (thickness 0.5 mm) and a protector layer (thickness 2 mm) formed on an outer periphery surface of the inner layer was continuously made.

Comparative Example 1

The composition of the rubber composition for forming a protector layer was changed to the combination shown in Table 2 below (rubber material A and rubber material C). Other than that, a hose having an inner layer formed on an outer periphery surface of an innermost layer and a protector layer formed on an outer periphery surface of the inner layer was continuously made in the same manner as the first example.

Comparative Example 2

A hose having an inner layer formed on an outer periphery surface of an innermost layer and a protector layer on an outer periphery surface of the inner layer was continuously made in the same manner as the first example except that only the rubber material D was used as a rubber composition for forming the protector layer.

TABLE 2

|  | Example | Comparative example | |
|---|---|---|---|
|  | 1 | 1 | 2 |
| First rubber material | B | C | D |
| Second rubber material | A | A |  |
| Temperature responsiveness |  |  |  |
| SN ratio | 50.08 | 48.74 | 43.33 |
| (evaluation) | good | poor | poor |

The hoses thus obtained in the example and the comparative examples were subjected to evaluation of temperature responsiveness according to criteria described below. The results are shown in Table 2 above.

[Temperature Responsiveness]

Temperature responsiveness was evaluated by the Taguchi method (reference: *Taguchi Method*. Union of Japanese Scientists and Engineers, 2004, and *Taguchi Method Nyuumon*. Nikkei Inc., 2009) by using vulcanization curves at 160° C. and 135° C. That is, the vulcanization curves at the respective temperatures (test temperature: 160° C. and 135° C., test time: 30 minutes) were obtained by a rheometer measuring device. Next, torque values (average values) at approximately 5 to 30 minutes after the start of the measurement were obtained. An SN ratio (calculated by $\eta=10 \log(\beta^2/\sigma^2)$) was obtained from a slope ($\beta$) of a regression line (slope at the time of straight-line approximation) using a least-square method and a standard deviation ($\sigma$) of data around the regression line. If the SN ratio was 50 or more, temperature responsiveness was evaluated as good. If the SN ratio was less than 50, temperature responsiveness was evaluated as poor.

From the result shown in Table 2 above, the product according to the example could accelerate vulcanization since it was excellent in temperature responsiveness.

On the other hand, the comparative examples 1 and 2 were inferior in temperature responsiveness.

In the example, a specific embodiment of the present invention is described. However, the example is only illustrative and should not be construed as restrictive. All changes which come within the meaning and range of equivalency of the claims are therefore intended to be embraced therein.

INDUSTRIAL APPLICABILITY

Examples of applications of a hose with a protector layer obtained by the manufacturing method of the present invention include a hose for transporting automobile fuel such as gasoline and a refrigerant-transporting hose in an automobile (such as an air conditioner hose and a radiator hose).

REFERENCE SIGNS LIST

1 Polyamide resin layer
2 Protector layer

The invention claimed is:

1. A method for manufacturing a hose having a protector layer formed on an outer periphery of a tubular polyamide resin layer, the method comprising steps of:
    preparing an unvulcanized rubber composition for forming the protector layer by separately preparing
    a first rubber material that contains following components (A) to (C):
        (A) ethylene-propylene rubber
        (B) sulfur
        (C) thiuram vulcanization accelerator with the melting point of 66 to 105° C., and
    a second rubber material that contains following components (a) and (b) but does not contain sulfur as a vulcanization agent:
        (a) ethylene-propylene rubber
        (b) vulcanization accelerator with the melting point of 120° C. or higher,
        wherein the vulcanization accelerator is selected from a group consisting of dithiocarbamate vulcanization accelerator, thiazole vulcanization accelerator and xanthate vulcanization accelerator;
    mixing the first rubber material and the second rubber material in a mixer to prepare the unvulcanized rubber composition for forming the protector layer; and
    forming the protector layer by continuously vulcanizing the unvulcanized rubber composition after the unvulcanized rubber composition is continuously extruded onto the outer periphery of the previously formed polyamide resin layer.

2. The method for manufacturing a hose with a protector layer according to claim 1, wherein the component (C) is tetraethylthiuram disulfide.

3. The method for manufacturing a hose with a protector layer according to claim 1 or 2, wherein the component (b) is at least one of zinc dimethyldithiocarbamate and 2-mercaptobenzothiazole.

4. The method for manufacturing a hose with a protector layer according to claim 3, wherein the polyamide resin layer is a layer made of polyamide 12 (PA12).

5. The method for manufacturing a hose with a protector layer according to claim 4, wherein the vulcanization temperature is 100 to 170° C.

6. The method for manufacturing a hose with a protector layer according to claim 5, wherein
    the content of the component (B) is 1 to 4 parts by weight with respect to 100 parts by weight of the component (A),
    the content of the component (C) is 0.1 to 3 parts by weight with respect to 100 parts by weight of the component (A), and the content of the component (b) is 2 to 6 parts by weight with respect to 100 parts by weight of the component (a).

7. The method of manufacturing a hose with a protector layer according to claim 1, wherein the sulfur in component (B) is powdered sulfur.

8. The method of manufacturing a hose with a protector layer according to claim 1, wherein the sulfur in component (B) is precipitated sulfur.

9. The method of manufacturing a hose with a protector layer according to claim 1, wherein the sulfur in component (B) is insoluble sulfur.

10. The method of manufacturing a hose with a protector layer according to claim 1, wherein a mixture ratio by weight of the first rubber material to the second rubber material is 30/70 to 70/30.

11. The method for manufacturing a hose with a protector layer according to claim 1, the method further comprising:
   forming a fluorine resin layer on an inner surface of the polyamide resin layer.

* * * * *